United States Patent
Oshimi et al.

(10) Patent No.: US 6,169,794 B1
(45) Date of Patent: Jan. 2, 2001

(54) METHOD AND APPARATUS FOR SYNCHRONIZING DATABASES WITHIN INTELLIGENT NETWORK

(75) Inventors: Kiyoshi Oshimi; Hiroyuki Kida, both of Yokohama; Masaki Watanabe, Kawasaki; Shinichi Kozuka, Yokohama, all of (JP)

(73) Assignee: Fujitsu Limited, Kawasaki (JP)

( * ) Notice: Under 35 U.S.C. 154(b), the term of this patent shall be extended for 0 days.

(21) Appl. No.: 09/078,259

(22) Filed: May 13, 1998

(30) Foreign Application Priority Data

Dec. 5, 1997 (JP) .................................................. 9-335574

(51) Int. Cl.⁷ .................................................. H04M 3/42
(52) U.S. Cl. .............................. 379/207; 707/1; 707/200; 707/10
(58) Field of Search ..................................... 379/230, 229, 379/242, 201, 207, 219; 370/401; 707/1, 10, 200; 709/100

(56) References Cited

U.S. PATENT DOCUMENTS

| | | | |
|---|---|---|---|
| 5,452,450 | * | 9/1995 | Delory .................................. 707/10 |
| 5,481,601 | * | 1/1996 | Nazif et al. .......................... 379/207 |
| 5,579,384 | * | 11/1996 | Seymour .............................. 379/243 |
| 5,640,446 | * | 6/1997 | Everett et al. ....................... 379/115 |
| 5,890,156 | * | 3/1999 | Rekieta et al. ........................ 707/10 |
| 5,937,343 | * | 8/1999 | Leung ................................. 455/403 |
| 6,058,412 | * | 5/2000 | Kojima et al. ....................... 709/100 |
| 6,085,194 | * | 7/2000 | Ige et al. .............................. 707/10 |

FOREIGN PATENT DOCUMENTS

| | | |
|---|---|---|
| 7-160562 | 6/1995 | (JP) . |
| 8-107449 | 4/1996 | (JP) . |
| 8-237360 | 9/1996 | (JP) . |

* cited by examiner

*Primary Examiner*—Harry S. Hong
*Assistant Examiner*—Benny Q. Tieu
(74) *Attorney, Agent, or Firm*—Helfgott & Kraas, P.C.

(57) ABSTRACT

In an IN where the same service is provided by a plurality of SCPs, data consistency is maintained when an update occurs to subscriber data as a result of processing a service for a subscriber. When an update is made to a subscriber database in an SCP, update information is sent to the other SCPs by way of a route selected from among a route via a common channel signaling network, a route via a LAN, and a route via an SMS. Updates occurring during backup or restore processing on a main subscriber database in the SMS are accumulated within the SMS, and the accumulated updates are applied to the main subscriber database after completion of the processing.

10 Claims, 16 Drawing Sheets

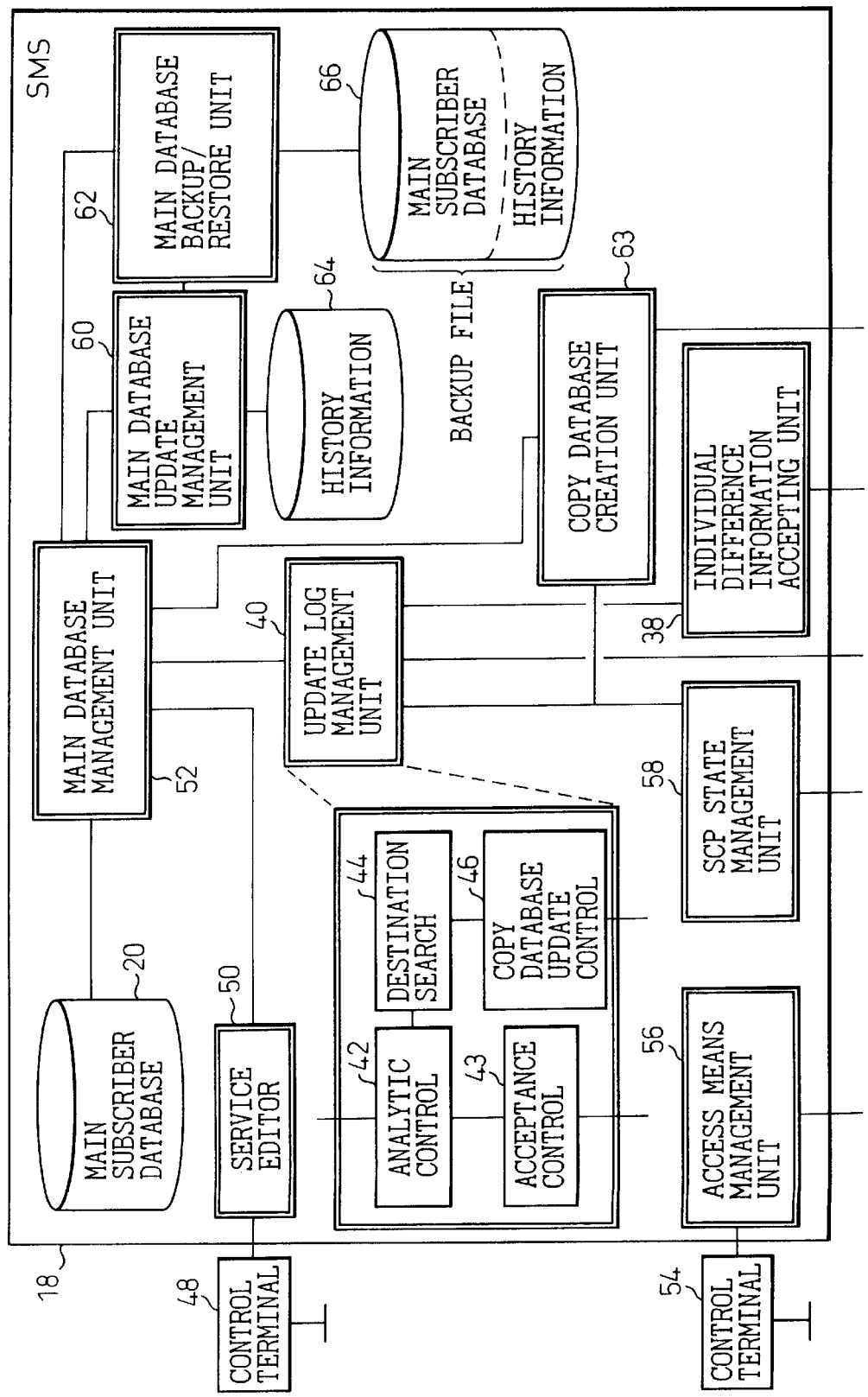

Fig. 4

SERVICE IMPLEMENTATION TABLE

| HOST NAME | NUMBER OF SERVICES | SERVICE 1 | SERVICE 2 | SERVICE 3 | ROUTE | DEVICE INFORMATION | SUB INFORMATION |
|---|---|---|---|---|---|---|---|
| SMS 1 | 2 | ABS | NPS | — | LAN | YY.YYY.YY.YYY | IMMEDIATELY NOTIFY |
| SCP-1 | 2 | ABS | NPS | — | COMMON CHANNEL SIGNALING NETWORK | YY.YYY.YY.YYY | — |
| SCP-2 | 2 | ABS | NPS | — | COMMON CHANNEL SIGNALING NETWORK | YY.YYY.YY.YYY | — |
| SCP-3 SCP-4 SCP-5 | 2 2 1 | ABS ABS NPS | NPS NPS — | — — — | LAN LAN COMMON CHANNEL SIGNALING NETWORK | xxx.xx.xxx.xx xxx.xx.xxx.xx YY.YYY.YY.YYY | — |
| SCP-6 | 1 | NPS | — | — | COMMON CHANNEL SIGNALING NETWORK | YY.YYY.YY.YYY | — |

30

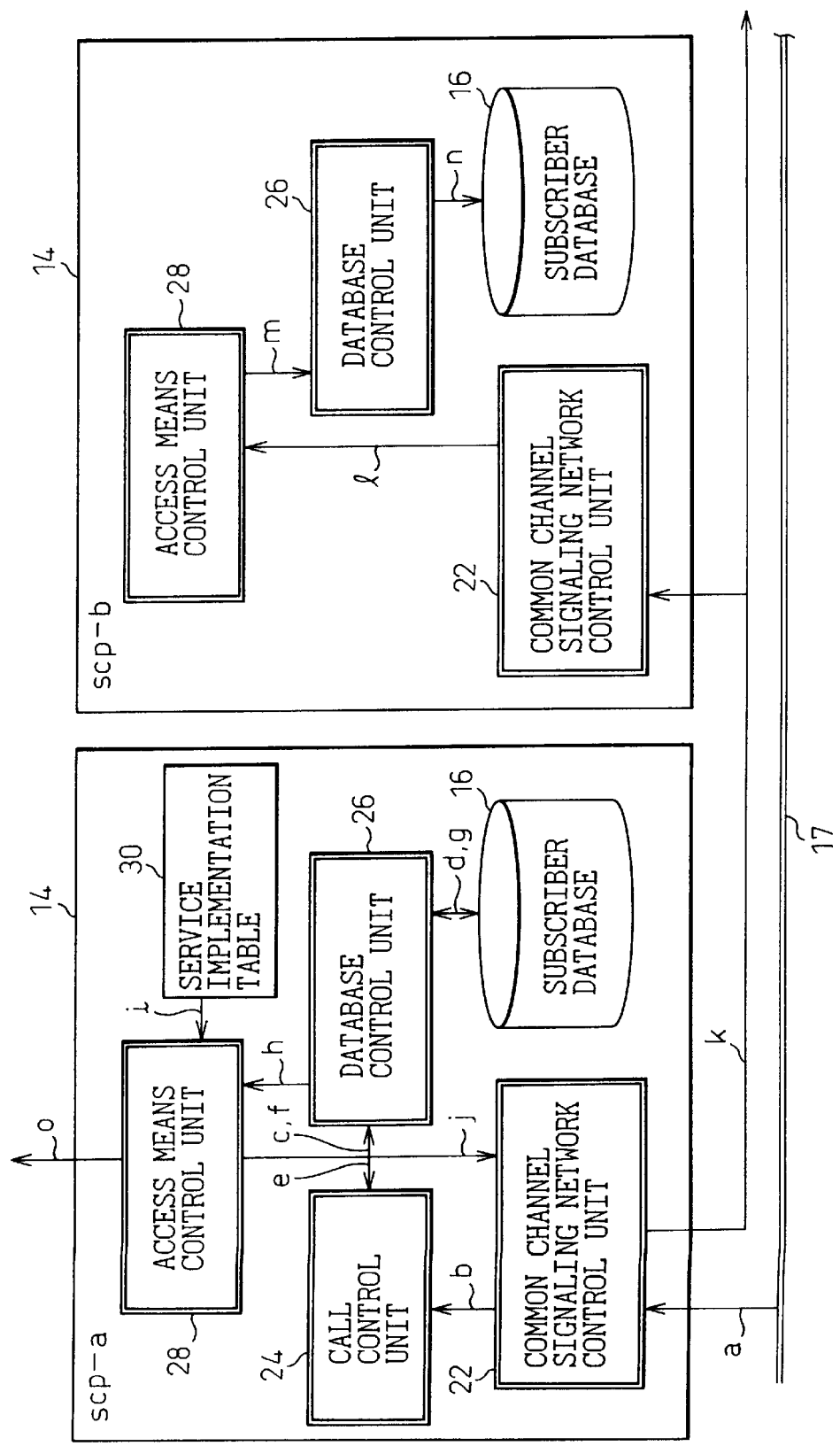

Fig.11

SCP STATUS TABLE 70

| HOST NAME | SCP STATUS | PREVIOUS STATUS TIME | PREVIOUS STATUS | PAIR HOST | GROUP NAME |
|---|---|---|---|---|---|
| SCP-1 | 4 | 1996.12.10 07:00:00 | 2 | SCP-2 | G1 |
| SCP-2 | 1 | 1996.12.10 05:00:00 | 1 | SCP-1 | G1 |
| SCP-3 | 1 | 1996.12.01 12:00:00 | 1 | SCP-4 | G2 |
| SCP-4 | 2 | 1996.12.01 12:30:00 | 2 | SCP-3 | G2 |
| SCP-5 | 1 | 1996.12.01 12:00:00 | 1 | SCP-6 | G3 |
| SCP-6 | 2 | 1996.12.01 12:30:00 | 2 | SCP-5 | G3 |

Fig.12

SYNCHRONIZATION ROUTE INFORMATION 72

| HOST NAME | ROUTE | COMMON CHANNEL SIGNALING INFORMATION | LAN INFORMATION | TRANSFER MODE |
|---|---|---|---|---|
| SMS | — | — | YY.YYY.YY.YYY | IMMEDIATELY NOTIFY |
| SCP-1 | COMMON CHANNEL SIGNALING | YY.YYYY.YY.YYY | YY.YYY.YY.YYY | IMMEDIATELY NOTIFY |
| SCP-2 | COMMON CHANNEL SIGNALING | YY.YYY.YY.YYY | YY.YYY.YY.YYY | IMMEDIATELY NOTIFY |
| SCP-3 | LAN | xxx.xx.xxx.xx | xxx.xx.xxx.xx | IMMEDIATELY NOTIFY |
| SCP-4 | LAN | xxx.xx.xxx.xx | xxx.xx.xxx.xx | IMMEDIATELY NOTIFY |
| SCP-5 | COMMON CHANNEL SIGNALING | YY.YYY.YY.YYY | YY.YYY.YY.YYY | OUTPUT AS DIFFERENCE LOG |
| SCP-6 | COMMON CHANNEL SIGNALING | YY.YYY.YY.YYY | YY.YYY.YY.YYY | OUTPUT AS DIFFERENCE LOG |

Fig.13

| 0 | TIME STAMP | 1996.12.12 13:00:00 |
|---|---|---|
| 1 | HOST NAME | SCP-1 |
| 2 | SERVICE NAME | ACS |
| 3 | TABLE NAME | CUSTOMER-T |
| 4 | SEARCH KEY | /89852801 |
| 5 | NUMBER OF ITEMS | 1 |
| 6 | DATA BEFORE UPDATE | PIN = "111" |
| 7 | DATA AFTER UPDATE | PIN = "333" |

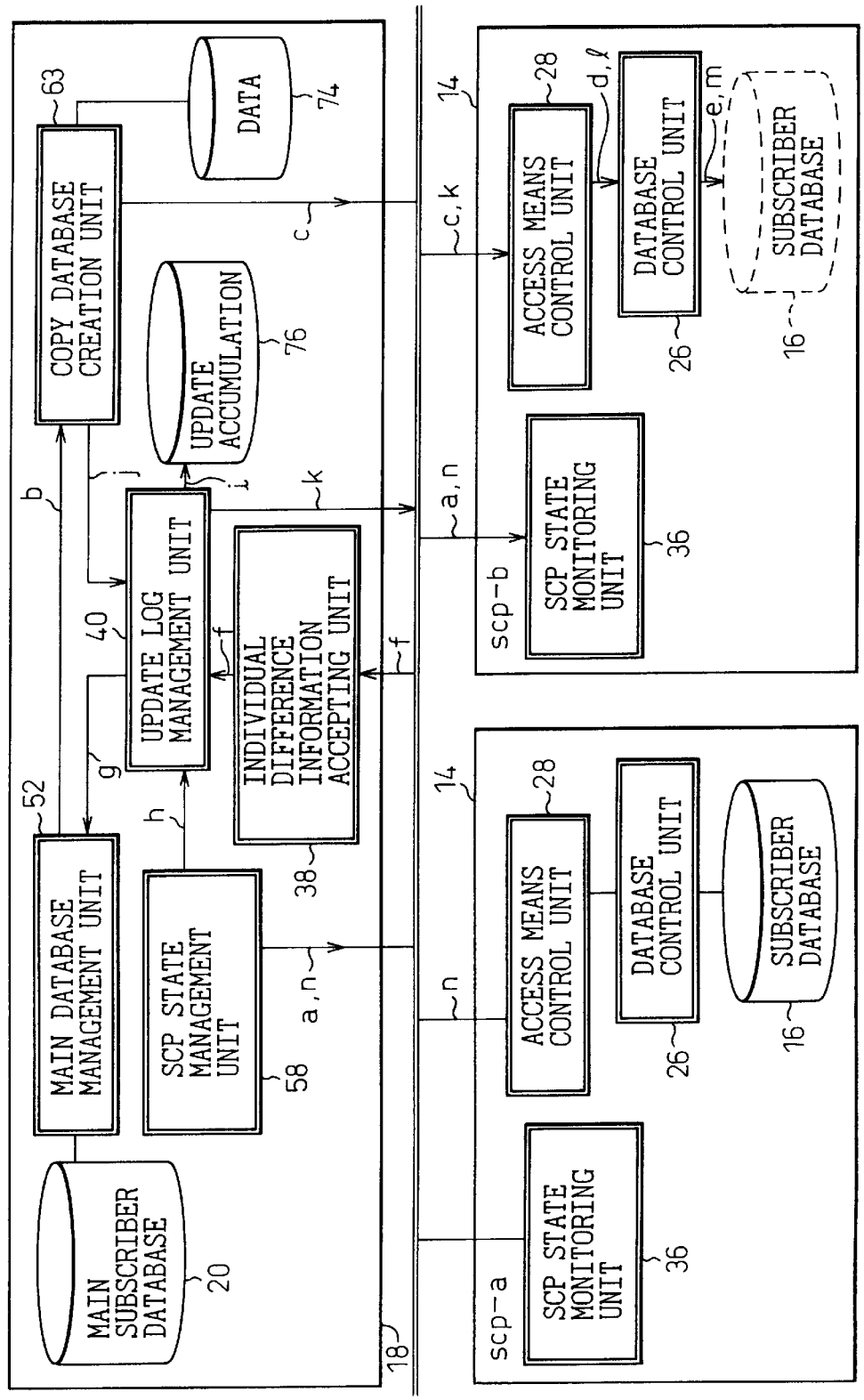

METHOD AND APPARATUS FOR SYNCHRONIZING DATABASES WITHIN INTELLIGENT NETWORK

BACKGROUND OF THE INVENTION

1. Field of the Invention

The present invention relates to a method and apparatus for synchronizing databases within an intelligent network (IN) or an advanced intelligent network (AIN) (hereinafter referred to generically as an intelligent network or IN) that has a plurality of service control points providing the same service, each service control point being able to update its database independently of the others.

2. Description of the Related Art

An IN comprises a plurality of service switching points (SSPs) as exchanges, service control points (SCPs) which have databases required to provide services and which execute services in response to requests from the SSPs by referring to the databases, and a service management system (SMS) which centrally manages data additions and updates made in the databases contained in the SCPs. The SSPs and SCPs are connected via a common channel signaling network that is also used to transfer call control signals, and the SCPs are connected with the SMS through a data communications network such as a local area network (LAN).

In such an IN, when the amount of traffic predicted for a certain service exceeds the amount that one SCP can handle, it is practiced to distribute the processing of the service among multiple SCPs by storing the records of identical contents necessary to provide the service in the databases at the multiple SCPs. In this case, when there occurs an addition or change in the registered contents, the addition or change is first applied to the database in the SMS, then its contents are converted into the data format compatible with that of the SCPs and downloaded into all of the associated SCPs. However, in the case of a service in which an update to the SCP database occurs for each call, such as a service that enables a password to be changed immediately in response to a request from a subscriber or a service that adds up total call counts and call charges per month and notifies a subscriber when the total count or charge approaches its upper limit value, there will be no problem if only one SCP provides the service but, if the same service is distributed among multiple SCPs, some means must be provided to synchronize updates between multiple databases in order to guarantee data consistency. Japanese Unexamined Patent Publication No. 8-107449 (EP 0 702 499 A2 Patent Family) describes a system in which synchronization of updates between databases distributed over geographically different locations is achieved by means of communications over a common channel signaling network.

In this document, a common channel signaling network is used to synchronize updates between multiple databases, but since the same common channel signaling network is also used to transfer call control signals, there can arise cases where a sufficient traffic capacity is not available. Furthermore, since INs are configured in various ways by different telephone companies, it is desirable that the system be constructed so that it can accommodate any configuration.

Further, backup of database contents and restore processing using the backup usually takes a considerable time, and to provide a service in which an update to the database occurs for each call as earlier described, there arises the problem of how the updates occurring during the backup and restore process are incorporated into the database.

SUMMARY OF THE INVENTION

Accordingly, a first object of the present invention is to provide flexibility to a means used to synchronize updates between multiple databases within an IN.

A second object of the present invention is to maintain synchronization between databases by appropriately processing database updates occurring during backup processing.

According to the present invention, there is provided a method of synchronizing a plurality of databases that are respectively contained in a plurality of service control points providing the service within an intelligent network, comprising the steps of: storing for each of the plurality of service control points a specification specifying a transfer mode for transferring a difference arising from an update made to the database; when a difference occurs as a result of an update made to the database, locating other service control points providing the service relevant to the difference; determining one of a plurality of transfer modes as a transfer mode for transferring the difference to those other service control points, in accordance with the stored transfer mode specification; and transferring the difference using the determined transfer mode.

According to the present invention, there is also provided a method of synchronization during backup of a database in a service management system within an intelligent network, comprising the steps of: prohibiting updates to the database during data transfer from the database to a database backup file or during data transfer from the database backup file to the database; accumulating update requests occurring during the data transfer in a history information file; and updating the database after completion of the data transfer on the basis of the contents of the history information file.

According to the present invention, there is also provided a method of synchronizing a database in a service control point to a database in a service management system within an intelligent network, comprising the steps of: creating database contents for the service control point from the contents of the database in the service management system; transferring the created contents from the service management system to the service control point; storing the transferred contents into the database in the service control point; accumulating, in an update accumulation file, differences arising from updates to the database in the service control point during an interval between the time the creation of the database contents is initiated and the time the database contents are stored; and transferring the accumulated differences to the service control point.

According to the present invention, there is also provided an apparatus for synchronizing a plurality of databases that are respectively contained in a plurality of service control points providing the same service within an intelligent network, comprising: means for storing for each of the plurality of service control points a specification specifying a transfer mode for transferring a difference arising from an update made to the database; means for, when a difference occurs as a result of an update made to the database, locating other service control points providing the service relevant to the difference; means for determining one of a plurality of transfer modes as a transfer mode for transferring the difference to those other service control points, in accordance with the stored transfer mode specification; and means for transferring the difference using the determined transfer mode.

According to the present invention, there is also provided an apparatus for synchronization during backup of a database in a service management system within an intelligent network, comprising: means for prohibiting updates to the database during data transfer from the database to a database backup file or during data transfer from the database backup file to the database; means for accumulating update requests occurring during the data transfer in a history information file; and means for updating the database after completion of the data transfer on the basis of the contents of the history information file.

According to the present invention, there is also provided an apparatus for synchronizing a database in a service control point to a database in a service management system within an intelligent network, comprising: means for creating database contents for the service control point from the contents of the database in the service management system; means for transferring the created contents from the service management system to the service control point; means for storing the transferred contents into the database in the service control point; means for accumulating, in an update accumulation file, differences arising from updates to the database in the service control point during an interval between the time the creation of the database contents is initiated and the time the database contents are stored; and means for transferring the accumulated differences to the service control point.

Preferably, the plurality of transfer modes includes: a transfer mode that uses a route via a common channel signaling network by which the plurality of service control points and at least one service switching point are interconnected; a transfer mode that uses a route via a data communications network when the plurality of service control points are interconnected with a service management system via the data communications network; and a transfer mode that uses a route via an individual connection when each of the plurality of service control points is connected to the service management system on an individual basis.

BRIEF DESCRIPTION OF THE DRAWINGS

FIG. 3 is a block diagram showing the configuration of a service management system (SMS) according to the present invention;

FIG. 4 is a diagram showing one example of a service implementation table 30;

FIG. 5 is a diagram showing an update synchronization procedure conducted in SCPs using a common channel signaling network;

FIG. 11 is a diagram showing one example of an SCP status table 70;

FIG. 12 is a diagram showing one example of synchronization route information 72;

FIG. 13 is a diagram showing one example of a difference information format;

FIG. 16 is a diagram showing an SMS-to-SCP downloading procedure.

DESCRIPTION OF THE PREFERRED EMBODIMENTS

Figure 1:
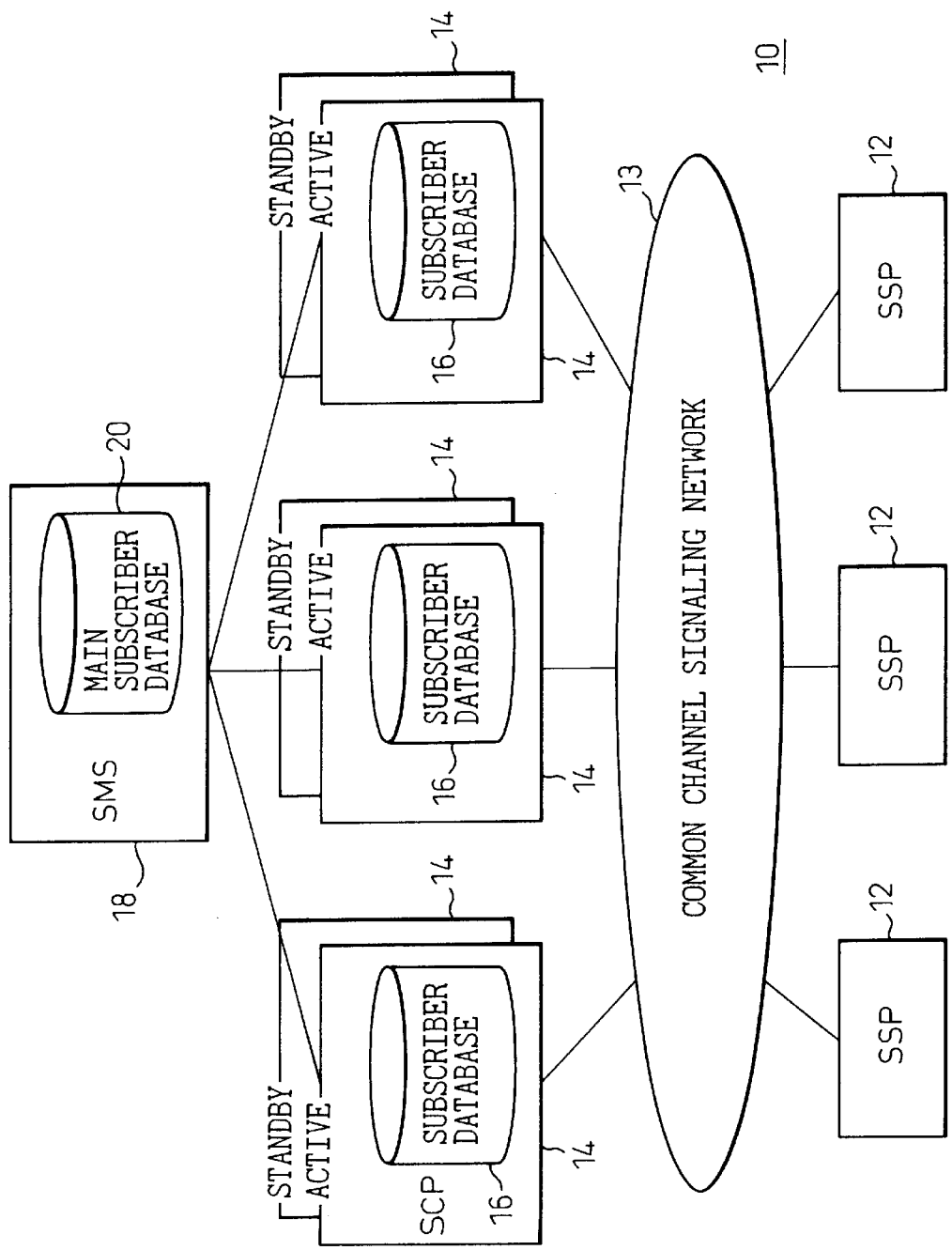
FIG. 1 is a diagram showing one example of an intelligent network (IN)

FIG. 1 shows one example of an intelligent network (IN) 10. The IN 10 comprises service switching points (SSPs) 12 as exchanges, service control points (SCPs) 14 which, by referring to subscriber databases 16, execute services in response to requests received from the SSPs over a common channel signaling network 13, and a service management system (SMS) 18 which manages additions and updates to the data contained in the SCPs 14. The SMS 18 has a main subscriber database 20. The main subscriber database 20 stores subscriber data in such a form that the system administrator can easily retrieve the data. Before system start-up, or when a change occurs to the subscriber data, first the main subscriber database 20 is updated, and then the subscriber data relevant to the service provided by the respective SCPs 14 is converted into such a form that facilitates the implementation of the service by the SCPs 14, and is downloaded into the respective SCPs 14. The six SCPs 14 shown in the example of FIG. 1 are provided in pairs, one in each pair as an active unit and the other as a standby unit. In the example of FIG. 1, the SCPs 14 are individually connected to the SMS 18, but the SCPs 14 and the SMS 18 may be interconnected by a local area network (LAN).

Figure 2:
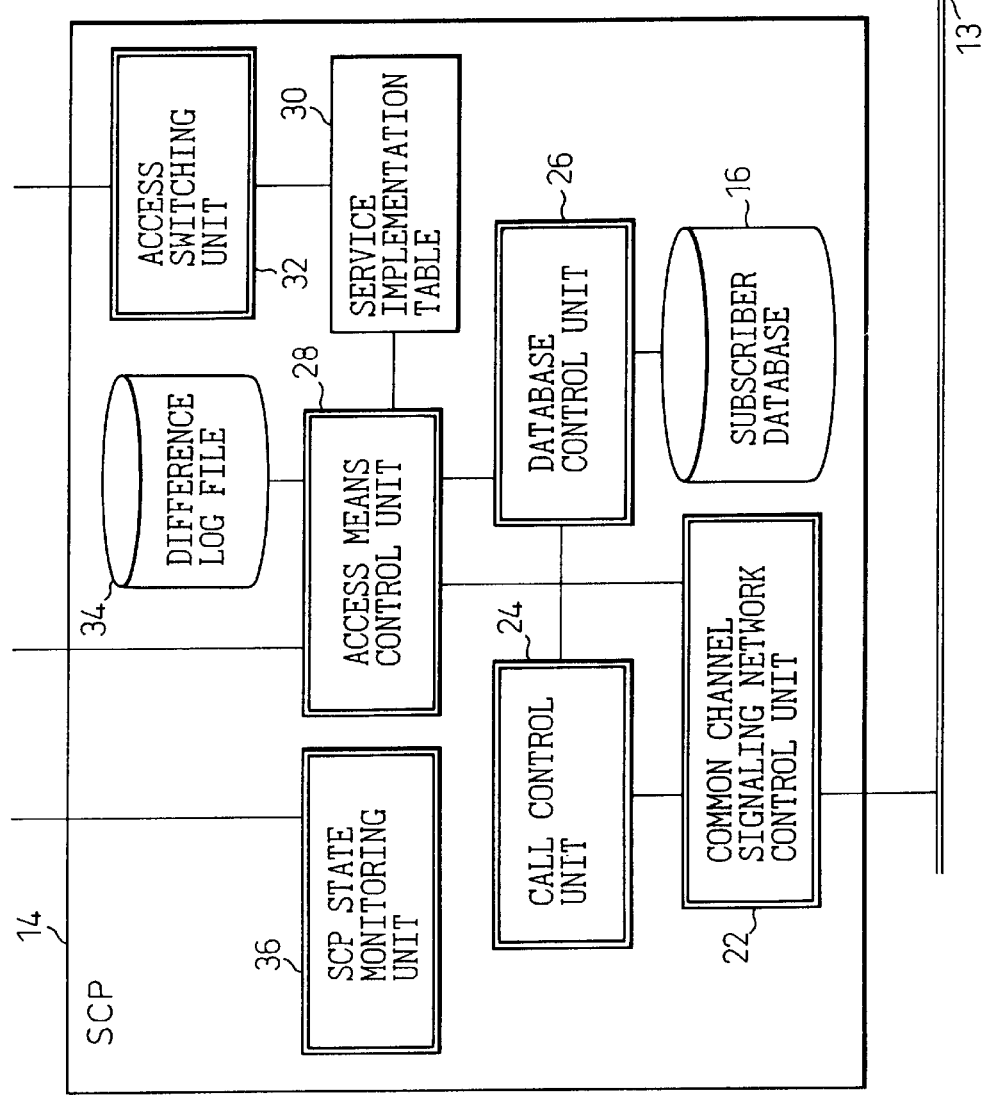
FIG. 2 is a block diagram showing the configuration of a service control point (SCP) according to the present invention.

FIG. 2 shows the detailed configuration of the SCP 14 according to the present invention. A common channel signaling network control unit 22 is responsible for interfacing with the common channel signaling network 13. A call control unit 24 receives a query from the SSP 12 (FIG. 1) over the common channel signaling network 13 and via the common channel signaling network control unit 22 and, in response to the query, performs service processing by referring to the customer information stored in the subscriber database 16. When a change is made in the customer information as the result of the service processing, this is detected by a database control unit 26 which then notifies an access means control unit 28 of any differences arising from the change. Based on the contents of a service implementation table 30 (hereinafter described), the access means control unit 28 locates other SCPs providing the same service, determines a means through which to notify those other SCPs (via the common channel signaling network 13, via a LAN, or via an SMS), and notifies those other SCPs of the differences. An access switching unit 32 reads and changes the service implementation table 30 in accordance with commands from the SMS 18. The differences are also reported to the SMS 18. The service implementation table 30 also stores a specification as to whether the differences are to be reported to the SMS 18 on a call-by-call basis or to be accumulated in a difference log file 34 and reported at a later time. An SCP state monitoring unit 36 reports the state (active state, standby state, etc.) of the SCP or changes the state in response to commands from the SMS 18.

FIG. 3 shows the detailed configuration of the SMS 18 according to the present invention. An individual difference information accepting unit 38 accepts a change (difference) that has occurred in the subscriber data in each individual SCP. An update log management unit 40 includes an analytic control section 42, an acceptance control section 43, a destination search section 44, and a copy database update control section 46; the functions of these sections will be described later. A control terminal 48 is provided to perform read, change, and add operations on the subscriber data in the main database 20 via a service editor 50 and a main database management unit 52. A control terminal 54 is provided to perform read, change, and add operations on the service implementation table 30 via an access means management unit 56 and via the access switching unit 32 (FIG. 2). An SCP state management unit 58 reads and changes the SCP state (active state, standby state, etc.) in cooperation with the SCP state monitoring unit 36 provided within the SCP. A main database update management unit 60, a main database backup/restore unit 62, and a copy database creation unit 63 will be described later.

FIG. 4 shows one example of the service implementation table 30 stored in each SCP. The column labeled "NUMBER OF SERVICES" stores the number of services accommodated in the respective SCPs including its own SCP. The columns "SERVICE 1", "SERVICE 2", and "SERVICE 3" store the names of the services accommodated. The "ROUTE" column stores the specification of routes (means) through which to notify the SMS and other SCPs, while the "DEVICE INFORMATION" column stores the address of each destination of the notification. The SMS row in the "SUB INFORMATION" column stores "IMMEDIATELY NOTIFY" when differences occurring in the subscriber data in the SCP are to be reported to the SMS on a call-by-call basis, and stores "OUTPUT AS LOG FILE" when differences are to be accumulated in the difference log file 34 and reported at a time. In the "ROUTE" column, the information stored in the row of its own SCP is not used.

Figure 6:
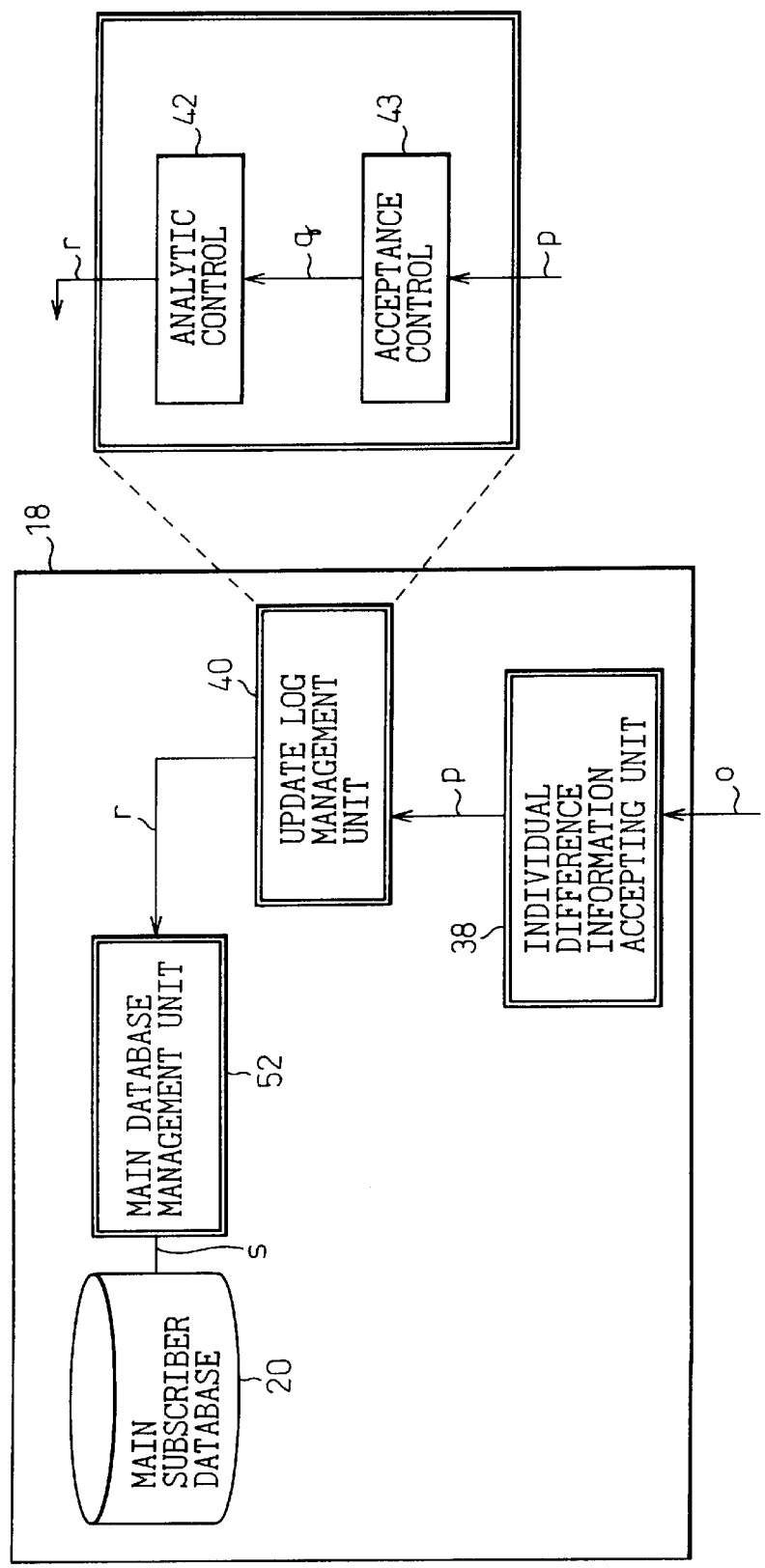
FIG. 6 is a diagram showing the update synchronization procedure conducted in an SMS.

Referring to FIGS. 5 and 6, the notification process when "COMMON CHANNEL SIGNALING NETWORK" is stored in the "ROUTE" column is described. Here, component elements that have no direct relevance to the illustrated process are omitted from the figures. In FIG. 5, a query sent from an SSP over the common channel signaling network 17 is accepted by the common channel signaling network control unit 22 in the scp-a (step a), the contents of the query are reported to the call control unit 24 (step b). The call control unit 24 asks the database control unit 26 to query the subscriber data (step c). The database control unit 26 reads the subscriber data from the subscriber database 16 (step d), and passes it to the call control unit 24 (step e). The call control unit 24 processes the service based on the subscriber data and, upon completion of the service processing, passes the subscriber data used back to the database control unit 26 (step f). The database control unit 26 checks the subscriber data to see if a change has been made to it and, if a change has been made, updates the subscriber database 16 (step g) and passes update information of the format shown, for example, in FIG. 13 to the access means control unit 28 (step h). The access means control unit 28 refers to the service implementation table 30 (step i), locates other SCPs providing the same service, and determines the notification route to these SCPs. If the notification "ROUTE" is via "COMMON CHANNEL SIGNALING NETWORK", the access means control unit 28 sends the update information and common channel signaling network addresses to the common channel signaling network control unit 22 (step j). The common channel signaling network control unit 22 sends the update information to other SCPs (scp-b, etc.) via the common channel signaling network (step k). The common channel signaling network control unit 22 in the scp-b passes the update information to the access means control unit 28 (step l). The access means control unit 28 passes the update information to the database control unit 26 to request a database update (step m). The database control unit 26 updates the subscriber database 16 (step n). In this way, the update made to the subscriber database in the scp-a is immediately synchronized to the subscriber databases in other SCPs (scp-b, etc.).

The access means control unit 28 in the scp-a also sends the update request to the individual difference information accepting unit 38 in the SMS 18 (step o). In FIG. 6, the individual difference information accepting unit 38 passes the update request to the acceptance control section 43 in the update log management unit 40 (step p). The acceptance control section 43 passes the update request to the analytic control section 42 (step q). The analytic control section 42 converts the update request into an internal code and makes an update request to the main database management unit 52 (step r). The main database management unit 52 updates the main subscriber database 20 (step s). In this way, the update made to the database in the scp-a is incorporated into the main subscriber database 20 in the SMS, accomplishing update synchronization between the SCP and SMS.

Figure 7:
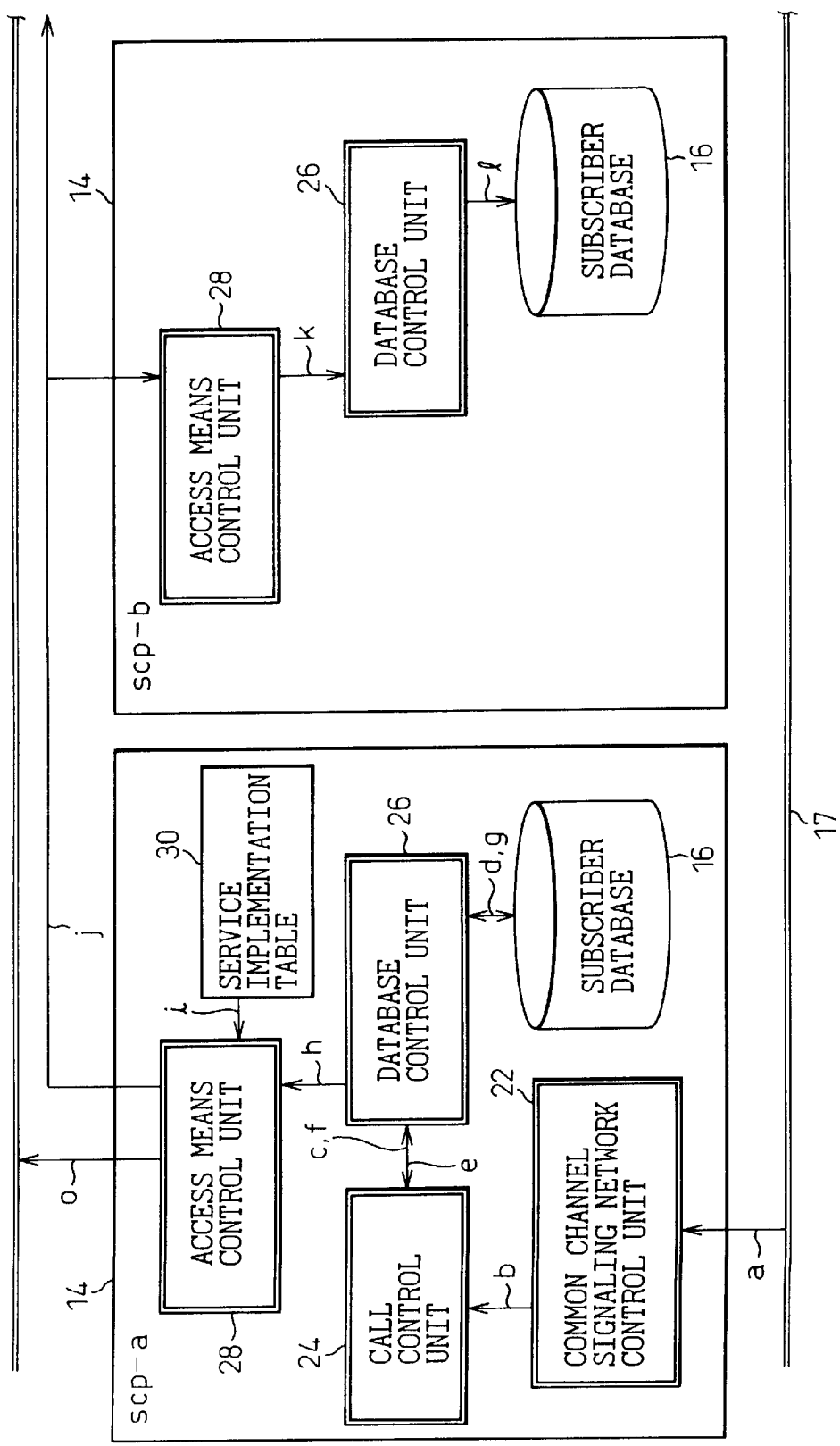
FIG. 7 is a diagram showing an update synchronization procedure conducted in SCPs using a LAN.

FIG. 7 shows the notification process when the route specified in the service implementation table 30 is "LAN". The process from steps a to i is the same as the corresponding process described with reference to FIG. 5, and therefore, the description of these steps will not repeated here. In step j, the update information is sent from the access means control unit 28 in the scp-a to the access means control unit 28 in the scp-b, etc. via the LAN. The access means control unit 28 in the scp-b, etc. passes the update information to the database control unit 26 to request a database update (step k). The database control unit 26 updates the subscriber database 16 (step l). In this way, the update made to the subscriber database in the scp-a is immediately synchronized to the subscriber databases in the scp-b, etc. The access means control unit 28 in the scp-a also sends the update request to the individual difference information accepting unit 38 in the SMS (step o). The process thereafter is the same as the process from steps p to s described with reference to FIG. 6, and therefore, the description of further steps will not be repeated here.

Figure 8:
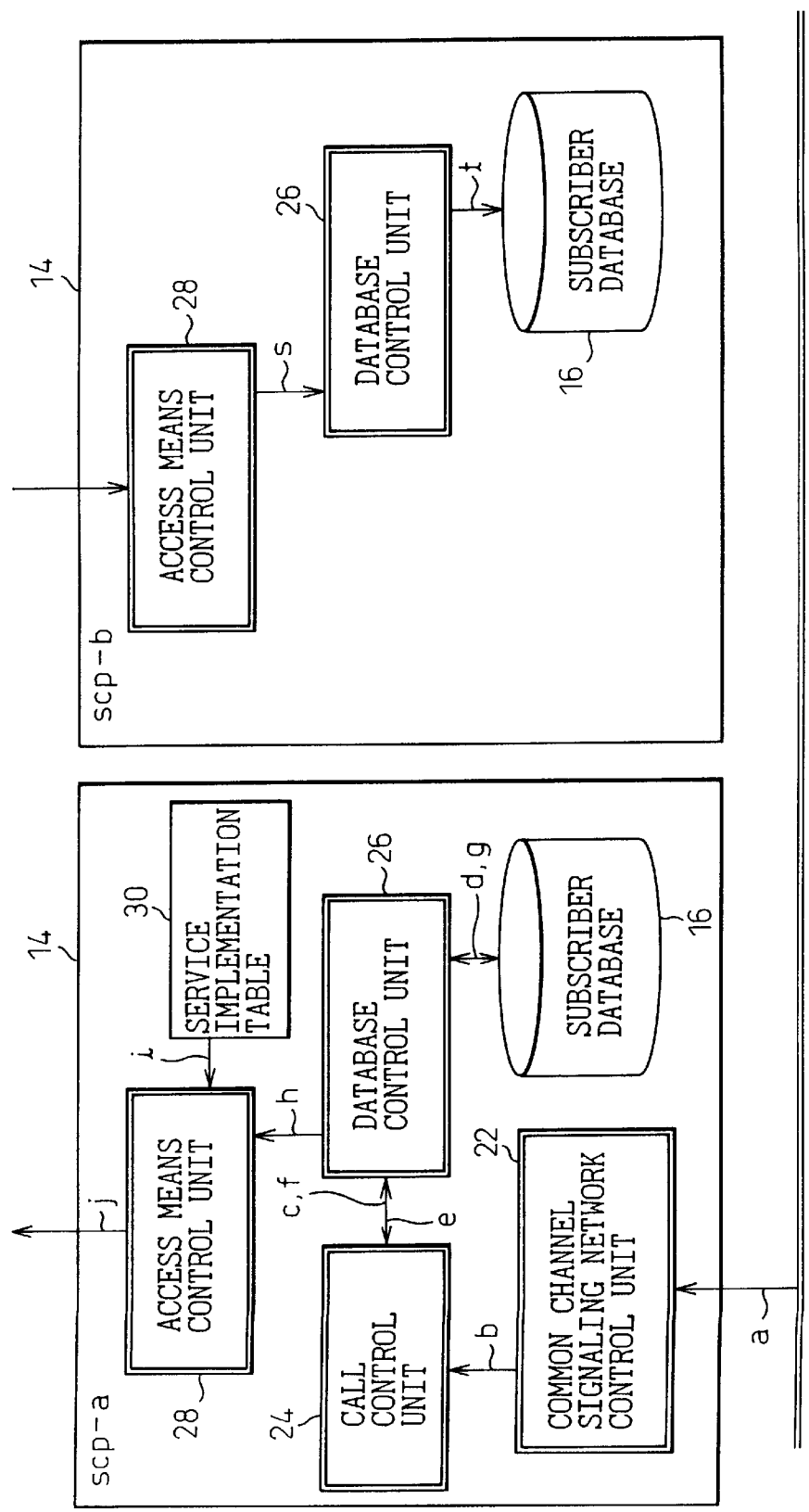
FIG. 8 is a diagram showing an SCP update synchronization procedure conducted in SCPs when the designated route is via the SMS.
Figure 9:
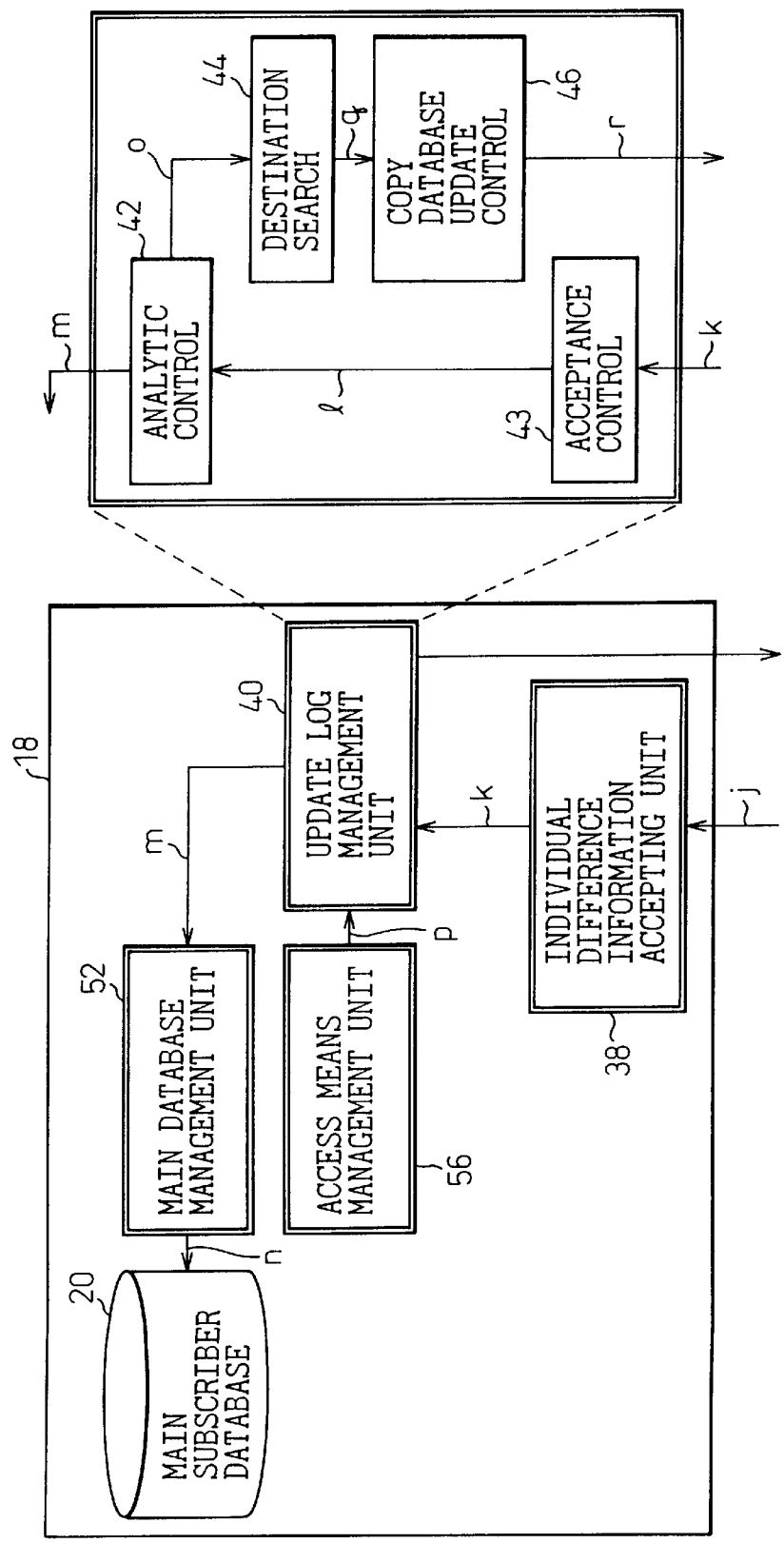
FIG. 9 is a diagram showing the SCP update synchronization procedure conducted in the SMS when the designated route is via the SMS.

FIGS. 8 and 9 show the notification process when the route specified in the service implementation table 30 is "VIA SMS". The process from steps a to i in FIG. 8 is the same as the corresponding process described with reference to FIG. 5, and therefore, the description of these steps will not repeated here. In step j, the update information is sent from the access means control unit 28 in the scp-a to the individual difference information accepting unit 38 in the SMS 18. In FIG. 9, the individual difference information accepting unit 38 passes the update request to the acceptance control section 43 in the update log management unit 40 (step k). The acceptance control section 43 passes the update request to the analytic control section 42 (step l). The analytic control section 42 converts the update request into an internal code and makes an update request to the main database management unit 52 (step m). The main database management unit 52 updates the main subscriber database 20 (step n). In this way, the update made to the database in the scp-a is incorporated into the main subscriber database 20 in the SMS 18.

Further, the analytic control section 42 passes the update request to the destination search section 44 (step o). The destination search section 44 searches via the SCP state management unit 58 for SCPs to which the update request is to be delivered (step p), and passes the update request and the SCP listing to the copy database update control section 46 (step q). The copy database update control section 46 delivers the update request to the access means control unit 28 in each of the listed SCPs (scp-b, etc.) (step r). In FIG. 8, the access means control unit 28 passes the update information to the database control unit 26 to request a database update (step s). The database control unit 26 updates the subscriber database 16 (step t). In this way, the update made to the subscriber database in the scp-a is immediately synchronized to the databases in the SMS and other SCPs (scp-b, etc.).

The processes described so far have dealt with the case where "IMMEDIATELY NOTIFY" is stored in the "SUB INFORMATION" column of the service implementation table 30 in FIG. 4. On the other hand, when "OUTPUT AS DIFFERENCE LOG" is stored in the "SUB INFORMATION" column, a notification is not sent to the SMS each time a difference occurs in the subscriber database 16 in the SCP, but the differences are accumulated in the difference log file 34 (see FIG. 2) as they occur.

Figure 10:
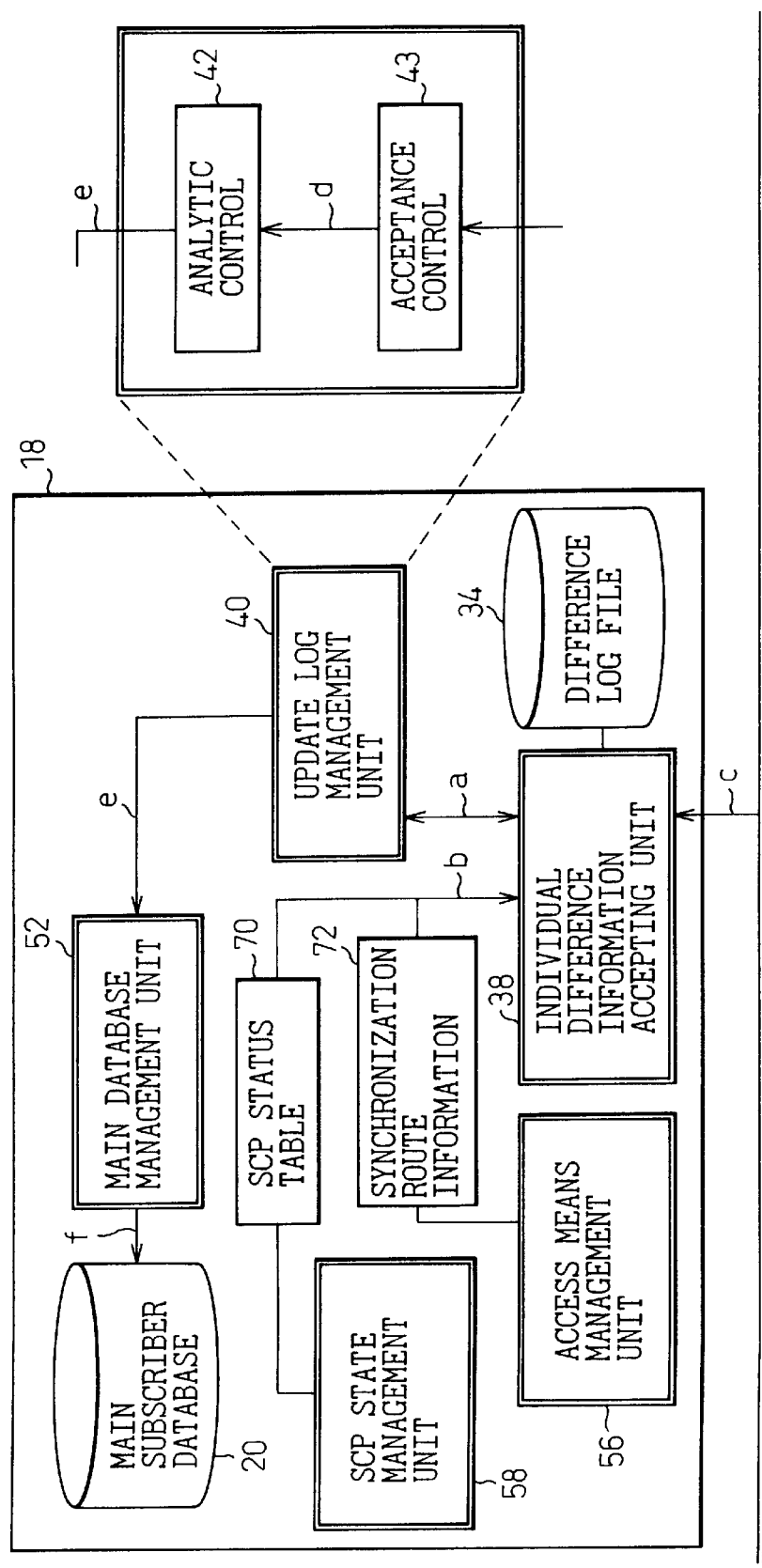
FIG. 10 is a diagram showing an update procedure using a difference log.

Referring to FIG. 10, we will describe the process in which the SMS receives the difference log accumulated in each SCP at fixed intervals of time. The update log management unit 40 issues a trigger to the individual difference information acceptance control unit 38 at regular intervals of time (for example, five minutes) (step a). The individual difference information acceptance control unit 38 acquires SCP status table information, such as the one shown in FIG. 11, from the SCP state management unit 58, and synchronization route information, such as the one shown in FIG. 12, from the access means management unit 56, and searches for SCPs which are active and whose SMS transfer mode is "OUTPUT AS DIFFERENCE LOG" (step b). The individual difference information acceptance control unit 38 acquires the difference log file 34 from each applicable SCP (step c). The difference log file 34 copied to the SMS is passed to the analytic control section 42 by way of the acceptance control section 43 (step d). Then, the update information is reordered by time stamp (see FIG. 13) and reported to the main database management unit 52 (step e). The main database management unit 52 updates the main subscriber database 20 (step f). With this process, the update made to the subscriber database in the scp-a is incorporated into the main subscriber database 20 in the SMS. This also serves to reduce the traffic between the SMS and SCP.

FIG. 11 shows one example of the SCP status table 70. In the SCP status column, "1" is stored for an active SCP, "2" for an SCP in cold standby, and "4" for an SCP in hot standby. In the PAIR HOST column, the name of the other SCP of each active/standby pair is stored.

FIG. 12 shows one example of the synchronization route information 72. "IMMEDIATELY NOTIFY" or "OUTPUT AS DIFFERENCE LOG" is stored in the TRANSFER MODE column.

The accumulation facility of the difference log file 34 can be utilized to accumulate update information when the SMS is unable to accept the update information due to maintenance or the like. If update information cannot be sent to the SMS 18 for some reason, the SCP 14 changes the contents of the "SUB INFORMATION" column in the service implementation table 30 (FIG. 4) from "IMMEDIATELY NOTIFY" to "OUTPUT AS LOG FILE" to accumulate the update information in the difference log file 34. In accordance with the process from steps a to f described with reference to FIG. 10, the SMS 18 acquires the contents of the difference log file 34, and updates the main subscriber database 20 accordingly.

Figure 14:
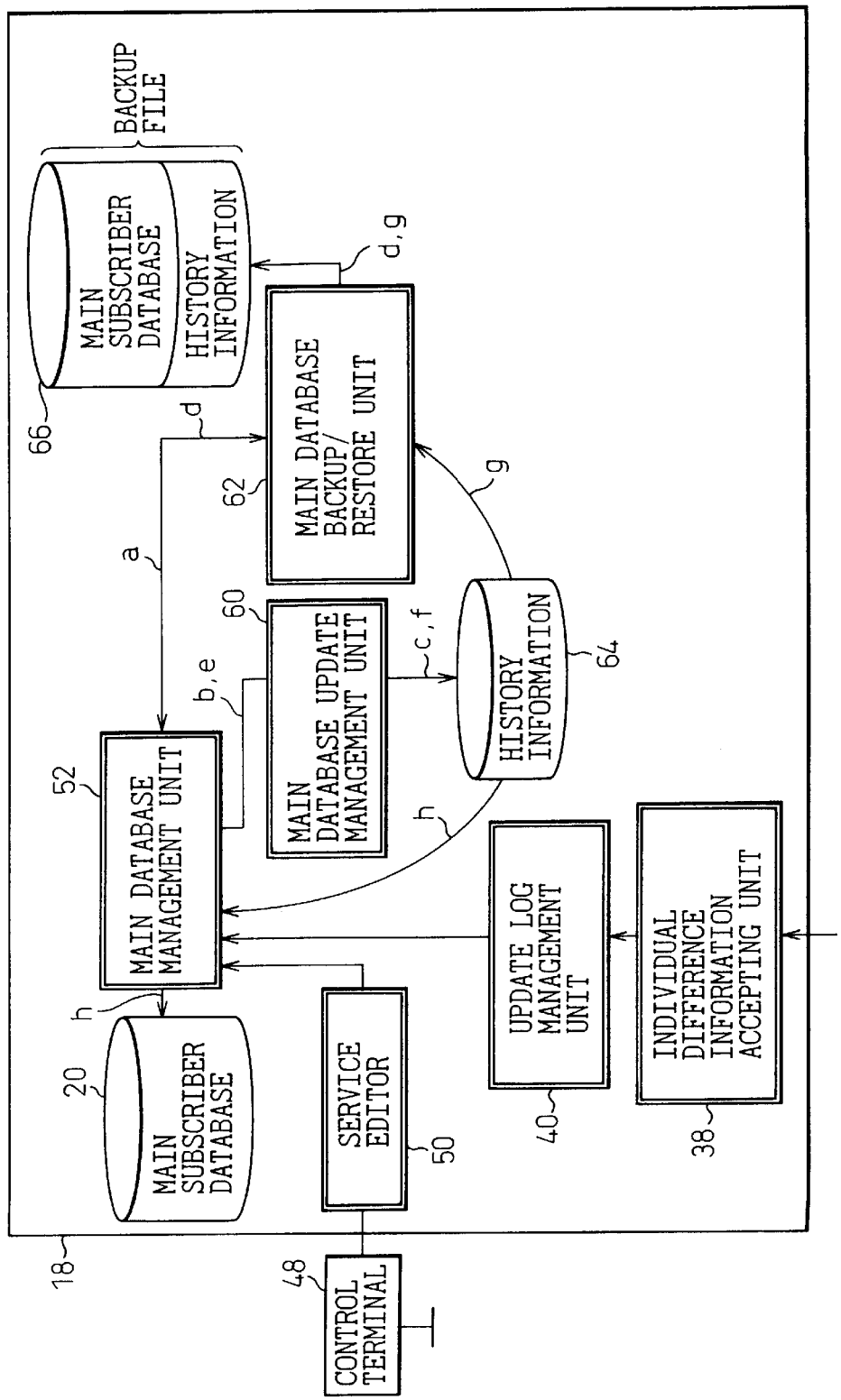
FIG. 14 is a diagram showing a backup procedure for a main subscriber database in the SMS.

Next, the process according to the present invention for creating a backup of the main subscriber database 20 in the SMS 18 and restoring data from the backup file will be described with reference to FIGS. 14 and 15. In the backup process shown in FIG. 14, when creating a backup of the main subscriber database 20, the main database backup/ restore unit 62 notifies the main database management unit 52 to prohibit any updates to the main subscriber database 20 (step a). The main database management unit 52 issues a request to the main database update management unit 60 to delete the contents of a history information file 64 (step b). The main database update management unit 60 deletes the contents of the history information file 64 (step c). The main database backup/restore unit 62 receives the contents of the main subscriber database 20 via the main database management unit 52 and creates a backup file 66 (step d). If an update request (an update request from the service editor 50 or the update log management unit 40, etc.) occurs during the period when updates to the main subscriber database 20 are prohibited, the main database management unit 52 sends the update information to the main database update management unit 60 (step e). At this time, the update is not applied to the main subscriber database 20. The main database update management unit 60 stores the update information in the history information file 64 (step f). After copying the contents of the main subscriber database 20 to the backup file 66, the main database backup/restore unit 62 reads the history information file 64 (step g) and adds the information to the backup file 66 to complete the backup process. Then, the main database backup/restore unit 62 notifies the main database management unit 52 to resume updates to the main subscriber database 20. The main database management unit 52 updates the main subscriber database 20 based on the contents of the history information file 64 (step h).

Figure 15:
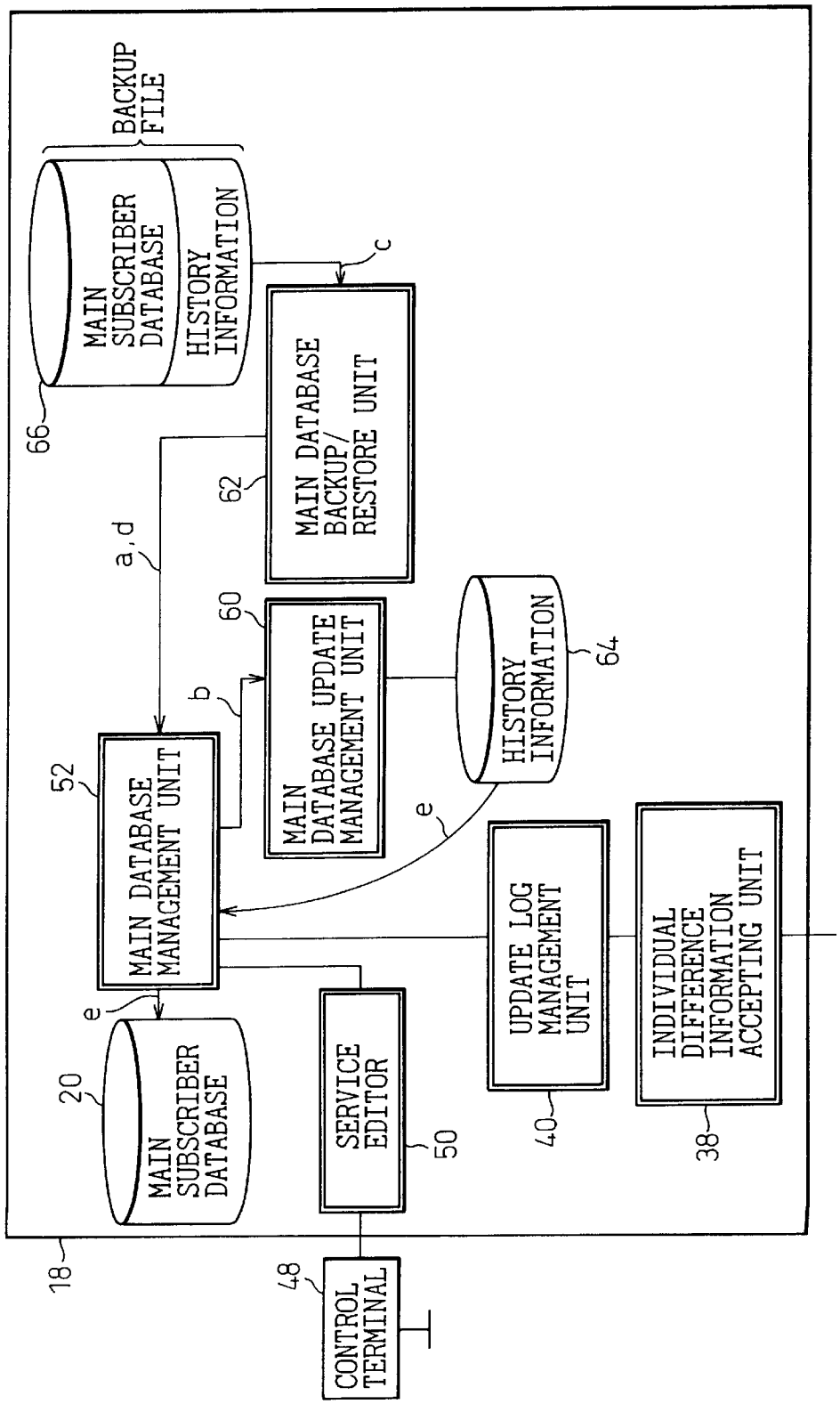
FIG. 15 is a diagram showing a restore procedure for the main subscriber database in the SMS.

In the restore process shown in FIG. 15, when restoring data to the main subscriber database 20, the main database backup/restore unit 62 notifies the main database management unit 52 to prohibit any updates to the main subscriber database 20 (step a). If an update request (an update request from the service editor 50 or the update log management unit 40, etc.) occurs during the period when updates to the main subscriber database 20 are prohibited, the main database management unit 52 sends the update information to the main database update management unit 60 (step b). At this time, the update is not applied to the main subscriber database 20. The main database backup/restore unit 62 reconstructs the contents of the main subscriber database from the information in the backup file 66 in the order of the main subscriber database and the history information (step c), and stores them into the main subscriber database 20 via the main database management unit 52. The main database backup/restore unit 62 notifies the main database management unit 52 to resume updates to the main subscriber database 20 (step d). The main database management unit 52 updates the main subscriber database 20 based on the contents of the history information file 64 (step e).

If the subscriber database in the SCP 14 goes down, or if an inconsistency arises in the database contents between the SMS and the SCP because the contents of the main subscriber database 20 in the SMS 18 have been restored from the backup file, then the contents of the main subscriber database 20 in the SMS 18 are downloaded into the subscriber database in each SCP 14. Any data updates arising at the SCP side during this download period must also be incorporated into the database. This process will be described below with reference to FIG. 16.

The SCP state management unit 58 in the SMS 18 notifies the SCP state monitoring unit 36 in the standby host (scp-b) of the target SCP 14 to change the state of that host from the synchronized state (hot standby) to the non-synchronized state (cold standby) (step a). The copy database creation unit 63 reads the subscriber data from the main database management unit 52 (step b), and creates a data file 74. The copy database creation unit 63 then copies the data file 74 to the scp-b and notifies the access means control unit 28 of its file name (step c). The access means control unit 28 requests the database control unit 26 to delete the old subscriber database and expand the data file 74 (step d). The database control unit 26 expands the contents of the data file 74 and creates the subscriber database 16 (step e). Any changes occurring in the subscriber database in the scp-a during the creation of the subscriber database 16 in the scp-b are reported to the update log management unit 40 via the individual difference information accepting unit 38 (step f). The acceptance control section 43 in the update log management unit 40 passes the update request to the analytic control section 42. The analytic control section 42 converts the update request into an internal code and makes an update request to the main database management unit 52 (step g). The analytic control section 42 acquires the state of each SCP from the SCP state management unit 58 (step h) and, if the standby SCP state is the non-synchronized state (cold standby), creates an update accumulation file 76 specifically for that SCP, to accumulate update requests (step i). The copy database creation unit 63 notifies the update log management unit 40 upon completing the creation of the subscriber database 16 for the SCP in the non-synchronized state (cold standby) (step j). The update log management unit 40 notifies, via the destination search section 43 and the copy database update control section 46, the access means control unit 28 in the scp-b to update the subscriber database using the update accumulation file 76 (step k). The access means control unit 28 passes the update information to the database control unit 26 and makes a database update request (step l). The database control unit 26 updates the subscriber database 16 (step m). The SCP state management unit 58 issues a request to the SCP state monitoring unit 36 in each host (scp-a, scp-b) to switch the SCP state of the active host (scp-a) to the standby (cold standby) state (scp-b) and vice versa (step n). The active host name and the standby (cold standby) host name are now scp-b and scp-a, respectively. Further, the SCP state management unit 58 causes the state of the standby host (scp-a) to switch from the non-synchronized state (cold standby) to the synchronized state (hot standby) to synchronize the subscriber database 16 in the scp-a to that of the scp-b. With this process, update requests from subscribers can be prevented from being lost during the restoration of the subscriber data base 16.

The present invention can thus guarantee the consistency of subscriber information regardless of the system configuration of the intelligent network (even when the same service is being provided by multiple SCPs) when a telephone subscriber changes his subscriber information using his telephone or by voice communication. This feature enables the intelligent network to provide advanced services.

What is claimed is:

1. A method of synchronizing a plurality of databases that are respectively contained in a plurality of service control points providing the service within an intelligent network, comprising the steps of:
   (a) storing for each of said plurality of service control points a specification specifying a transfer mode for transferring a difference arising from an update made to the database;
   (b) when a difference occurs as a result of an update made to the database, locating other service control points providing the service relevant to said difference;
   (c) determining one of a plurality of transfer modes as a transfer mode for transferring said difference to said other service control points, in accordance with said stored transfer mode specification; and
   (d) transferring said difference using said determined transfer mode.

2. A method according to claim 1, wherein said plurality of transfer modes includes: a transfer mode that uses a route via a common channel signaling network by which said plurality of service control points and at least one service switching point are interconnected; a transfer mode that uses a route via a data communications network when said plurality of service control points are interconnected with a service management system via said data communications network; and a transfer mode that uses a route via an individual connection when each of said plurality of service control points is connected to said service management system on an individual basis.

3. A method according to claim 1, further comprising the steps of:
   (e) storing a specification as to whether differences are to be transferred to a service management system as they occur or after they are accumulated; and
   (f) transferring said differences to said service management system as they occur or after they are accumulated, in accordance with said specification.

4. A method of synchronization during backup of a database in a service management system within an intelligent network, comprising the steps of:
   (a) prohibiting updates to said database during data transfer from said database to a database backup file or during data transfer from said database backup file to said database;
   (b) accumulating update requests occurring during said data transfer in a history information file; and
   (c) updating said database after completion of said data transfer on the basis of the contents of said history information file.

5. A method of synchronizing a database in a service control point to a database in a service management system within an intelligent network, comprising the steps of:
   (a) creating database contents for said service control point from the contents of said database in said service management system;
   (b) transferring said created contents from said service management system to said service control point;
   (c) storing said transferred contents into said database in said service control point;
   (d) accumulating, in an update accumulation file, differences arising from updates to said database in said service control point during an interval between the time the creation of said database contents is initiated and the time said database contents are stored; and
   (e) transferring said accumulated differences to said service control point.

6. An apparatus for synchronizing a plurality of databases that are respectively contained in a plurality of service control points providing the same service within an intelligent network, comprising:

means for storing for each of said plurality of service control points a specification specifying a transfer mode for transferring a difference arising from an update made to the database;

means for, when a difference occurs as a result of an update made to the database, locating other service control points providing the service relevant to said difference;

means for determining one of a plurality of transfer modes as a transfer mode for transferring said difference to said other service control points, in accordance with said stored transfer mode specification; and means for transferring said difference using said determined transfer mode.

7. An apparatus according to claim 6, wherein said plurality of transfer modes includes: a transfer mode that uses a route via a common channel signaling network by which said plurality of service control points and at least one service switching point are interconnected; a transfer mode that uses a route via a data communications network when said plurality of service control points are interconnected with a service management system via said data communications network; and a transfer mode that uses a route via an individual connection when each of said plurality of service control points is connected to said service management system on an individual basis.

8. An apparatus according to claim 6, further comprising:

means for storing a specification as to whether differences are to be transferred to a service management system as they occur or after they are accumulated; and means for transferring said differences to said service management system as they occur or after they are accumulated, in accordance with said specification.

9. An apparatus for synchronization during backup of a database in a service management system within an intelligent network, comprising:

means for prohibiting updates to said database during data transfer from said database to a database backup file or during data transfer from said database backup file to said database;

means for accumulating update requests occurring during said data transfer in a history information file; and means for updating said database after completion of said data transfer on the basis of the contents of said history information file.

10. An apparatus for synchronizing a database in a service control point to a database in a service management system within an intelligent network, comprising:

means for creating database contents for said service control point from the contents of said database in said service management system;

means for transferring said created contents from said service management system to said service control point;

means for storing said transferred contents into said database in said service control point;

means for accumulating, in an update accumulation file, differences arising from updates to said database in said service control point during an interval between the time the creation of said database contents is initiated and the time said database contents are stored; and means for transferring said accumulated differences to said service control point.

\* \* \* \* \*